Dec. 8, 1925.  1,564,560

G. W. GRISDALE

RECORDING INSTRUMENT

Filed Oct. 31, 1923  2 Sheets-Sheet 2

Inventor
George W. Grisdale
by Robert M. Barr
Attorney.

Patented Dec. 8, 1925.

1,564,560

UNITED STATES PATENT OFFICE.

GEORGE W. GRISDALE, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

RECORDING INSTRUMENT.

Application filed October 31, 1923. Serial No. 671,963.

*To all whom it may concern:*

Be it known that I, GEORGE W. GRISDALE, a citizen of the United States, and a resident of Philadelphia, county of Philadelphia, State of Pennsylvania, have invented a certain new and useful Improvement in Recording Instruments, of which the following is a specification.

The present invention relates to recording instruments of the electrically actuated type wherein the respective positions of the instrument pointer as influenced by different current values are recorded upon a chart or strip of recording paper by means of an impression ribbon interposed between the pointer and paper.

Some of the objects of the present invention are to provide a recording instrument of the type referred to, with means whereby a recorded indication is displayed as soon as made; to provide means for removing immediately after the making of the record any portion of the recording mechanism which in normal recording position obstructs the view of the chart; to provide an impression ribbon and means for shifting said ribbon into and out of register with its recording position; to provide means for making impressions from a ribbon by moving said ribbon both lengthwise and in the direction of its width; to provide means for utilizing a larger surface of an impression ribbon than has heretofore been possible; and to provide other improvements as will hereinafter appear.

Figure 1:
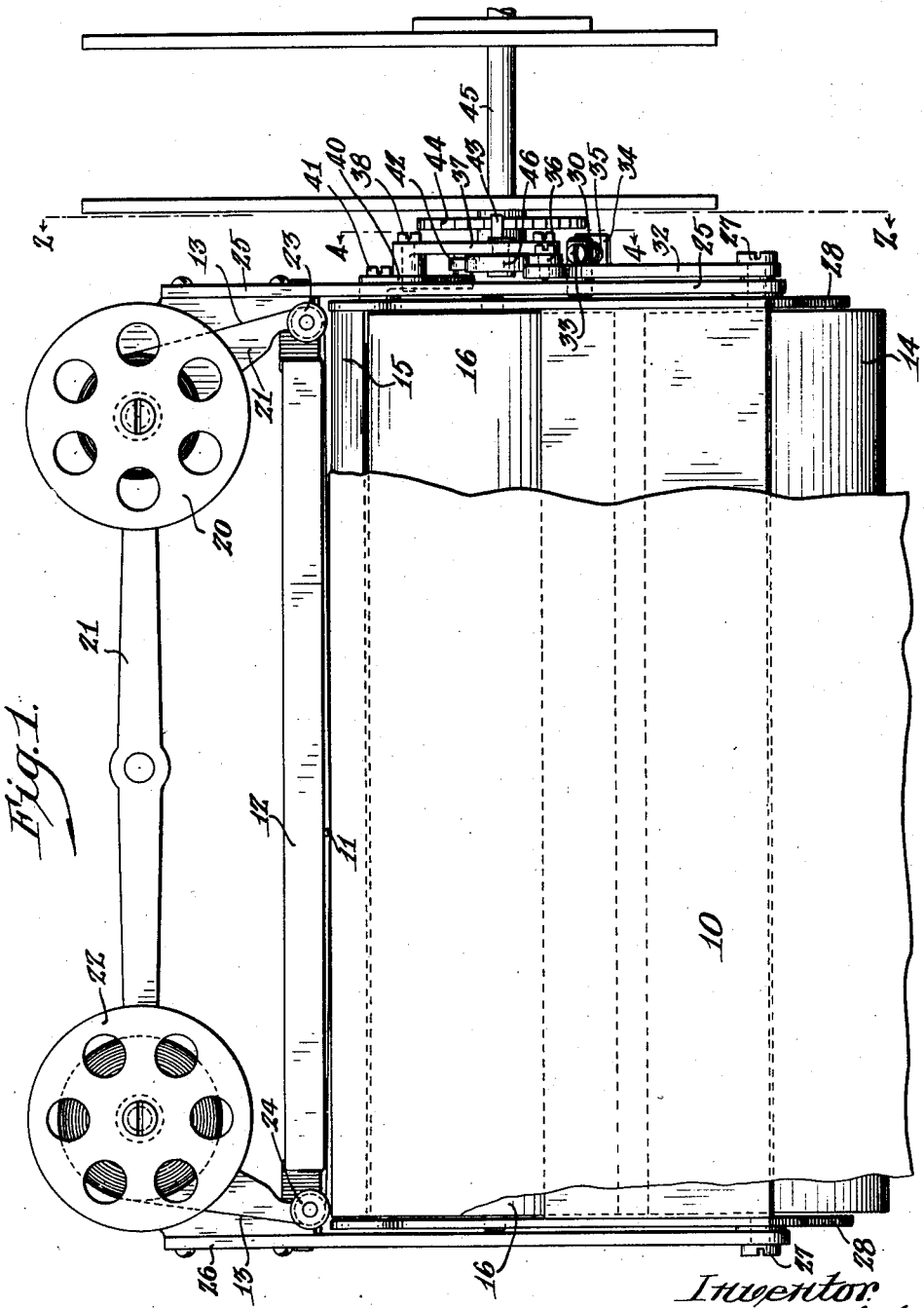
Figure 2:
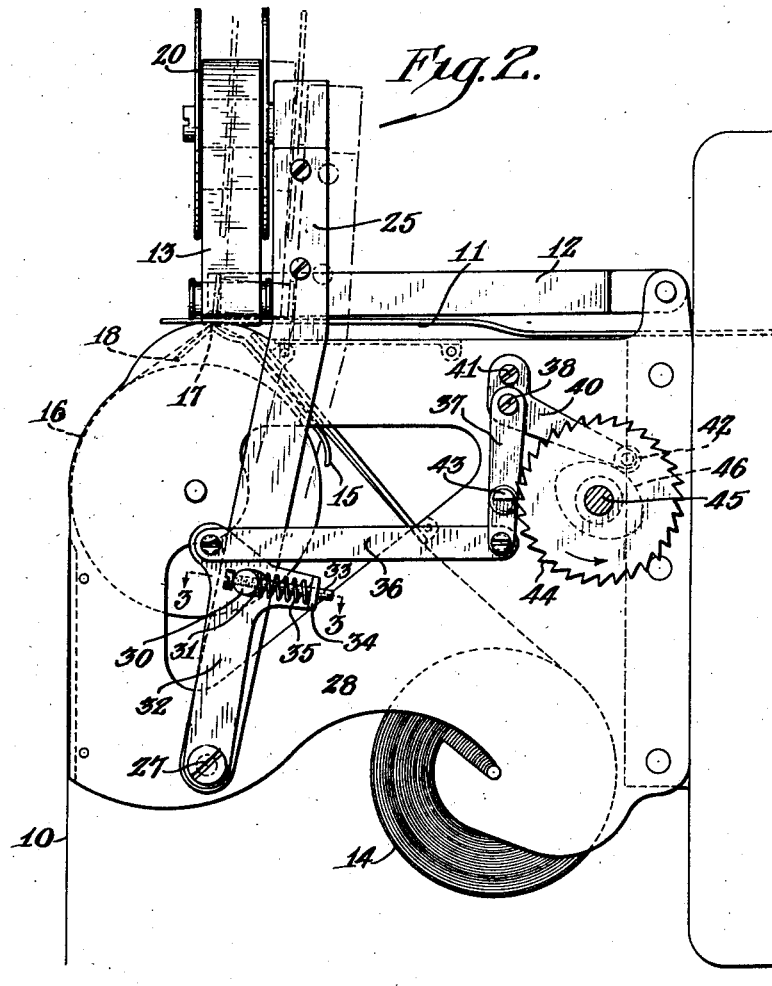
Figure 4:
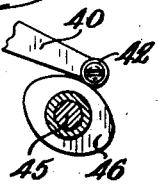
Figure 3:
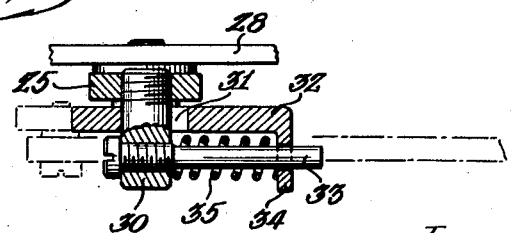

In the accompanying drawings, Fig. 1 represents a front elevation of a portion of a recording instrument showing the chart and adjuncts of the recording mechanism embodying one form of the present invention; Fig. 2 represents a section on line 2—2 of Fig. 1; Fig. 3 represents a section on line 3—3 of Fig. 2; Fig. 4 is a detail located on line 4—4 of Fig. 1.

Referring to the drawings, those parts of an electrical recording instrument are shown to which the present invention relates, and in this instance the instrument to which the invention is applied is a recording instrument of the type having a chart or record sheet 10, upon which a record of the temperature or other condition to be recorded is visibly made by means of a pointer 11 under the impact of a depressor bar 12 through the medium of a colored impression ribbon 13. The chart 10 is normally wound upon a spool 14, from which it is automatically fed by any suitable mechanism over a guide plate 15 to the front of the instrument, where it passes over a roller 16, and thence along the face of the instrument, to be wound upon a winding spool or drum, as will be understood. In this connection, it will be noted that the guide plate 15 is inclined upwardly toward the recording line of the instrument, where it is reversely bent to provide an edge or ridge 17, and then terminates in a downwardly inclined lip 18 directing the chart to the front of the instrument. The edge 17 thus extends as a straight edge from one side of the chart to the other below the pointer 11 and in the path of movement of the front or body portion of the depressor 12. This construction serves the purpose of a fixed relatively sharp edged anvil over which the chart 10 is fed and directed abruptly downward after passing the edge 17 to be guided by the lip 18 over the guide roller 16 away from the place of making the record.

The ribbon 13 is initially wound upon a spool 20, rotatably mounted in a frame 21, which carries at its opposite side a rotatable mounted spool 22 to which the free end of the ribbon is attached so that it is wound thereupon under the feeding mechanism which causes the ribbon to slowly traverse a path in close proximity to and transverse to the direction of travel of the chart paper. Guide rolls 23 and 24 are located at opposite sides of the frame 21 in order to properly position the ribbon with respect to the pointer 11 and the chart paper 10, and any suitable intermittent motion or any slowly continuous moving means may be provided for feeding the ribbon 13 in a desired manner across the chart 10.

The pointer 11 is operated by the sensitive element of an electrical instrument responsive to current variations produced by a thermo-couple subject to heat or of any other electrical current, the value of which is to be measured, and it is believed unnecessary to illustrate or further describe the actuation of the pointer 11, since this is a construction well known in the art.

In the ordinary recording instruments in present day use, the mechanism for producing the record upon the chart is either so far removed from the front of the instrument as to entirely obscure the recorded indication until the chart paper is moved a considerable distance from the point of making the record, or else the recording mechanism is so superposed with respect to the chart and point of making the record that it is impossible to see the record until the chart has been fed beyond the obstruction to a point of view at the front of the instrument. It is exceedingly desirable in recording instruments to be able to read the recorded indication as soon as it is made, without waiting for the chart paper to bring the record into view, or without having to open the instrument and pull the chart forward so that the record can be seen, and it is an object of the present invention to provide a structure whereby all recorded indications are instantly visible as soon as made by the instrument.

One form of the present invention, therefore, comprises a means for causing the recording ribbon and its associated parts to move rearwardly away from the front of the instrument after each recording operation and thereby at once show the last record made by the instrument. For this purpose the frame 21 is mounted at its opposite ends between two upright arms 25 and 26, the lower ends of which are pivoted respectively to stud bolts 27 fast to the frame 28 of the instrument. These arms 25 and 26 have their upper ends substantially parallel to the back of the ribbon frame 21, while their lower ends are inclined beneath the frame 21 to the fulcrum points 27, which latter are substantially in vertical alinement with the straight edge 17. This construction serves as a means to swing the ribbon frame toward or away from the front of the instrument while still maintaining the ribbon substantially tangent to the straight edge 17 for recording purposes. Movement is transmitted to the arm 25 by a stud 30 threaded into the said arm 25 and extending laterally therefrom to pass through a slot 31 in a rock link 32, which is also pivoted upon the fulcrum bolt 27 of the arm 25. The stud 30 has a yielding connection with the link 32 by means of a pin 33 threaded through the stud 30 and guided freely in a lug 34 projecting from the rock link 32. A coiled spring 35 is interposed under compression between the stud 30 and lug 34 and is coiled about the pin 33 so that it will be held in place.

In order to transmit movement to the rock link 32, it is connected by a link 36 to an arm 37, which is pivoted at 38 to a lever 40, the latter being pivoted at one end to the pivot 41 fixed to the frame 28, and at the other end carrying the cam roller 42. The arm 37 is provided with a laterally disposed lug 43, arranged to be engaged by a gear tooth cam 44, driven at any suitable timed speed from a shaft 45. For this purpose the lug 43 is flat on one side or may be otherwise cut away to conform generally to the configuration of the teeth of the cam 44, so that as the aforesaid cam rotates (in a counter-clockwise direction as here shown) the lug 43 will be alternately pushed out of a tooth of the cam and then dropped back into the next tooth, this movement causing a swinging of the arm 37 which is transmitted by way of the link 36 to the rock link 32, and thence by pin 33 and stud 30 to the arm 25 to shift the ribbon frame a predetermined distance, as shown in dotted lines, Fig. 2. The cam 44 is driven in timed relation with the other adjuncts of the instrument, and its teeth are so designed as to number and form as to cause the lug 43 to first operate its associated parts to swing the frame 21 to its recording position, and then allow it to swing back by gravity action, after the recording operation, to thereby leave the recorded indication at once in plain sight and unobstructed. During this return movement of the lug 43, that is, when it drops back into the next tooth, the spring 35 acts as a cushion to absorb the shock of the carriage and its parts when swinging to its non-operative position.

For the purpose of utilizing the maximum impression surface of the ribbon 13, a cam 46 is provided, which is also fast upon the shaft 45 and carries on its surface the cam roller 42 of the lever 40. This cam 46 is shown as having two opposite high points and two opposite low points, being therefore substantially elliptical in form, and its action causes a gradual swinging of the lever 40 through an arc upwardly and then through the same arc downwardly, so that the center 38 of the arm 37 is shifted to vary the throw of the link 36 and thus causes the frame 21 to assume a slightly different position with respect to the straight edge 17 after each recording operation. In consequence, an unused portion of the recording ribbon will be brought into place, and the wear of the ribbon will thus be distributed back and forth as well as lengthwise of the ribbon instead of in a straight line, as will be the case where the cam variation means is not employed. This construction prolongs the life of the recording ribbon while still producing a clear cut record by impact of the pointer upon an unused portion of the ribbon.

In taking up the description of the operation of the device, it should be understood that the chart paper 10 is fed by suitable mechanism so that the portion of the paper at the straight edge 17 is constantly being changed, and the portion with the record being fed away so that it passes down the front of the instrument; also that the ribbon is provided with a feeding mechanism which causes the ribbon to be fed lengthwise of the anvil member 17 so that a fresh impression surface is constantly maintained in position; and also that the depressor bar is provided with mechanism by which it is periodically actuated to strike the pointer 11 at definite time intervals to produce the record. Under inoperative conditions of the instrument, the control cam 44 has a position such that the lug 43 is seated in one of the teeth, and hence the ribbon frame is shifted in a direction opposite to the direction of feed of the chart paper 10, and rests in the position indicated in dotted lines on Fig. 2. With the instrument in operation, the cam 44 receives a motion which causes the tooth then in engagement with the lug 43 to cause the latter to ride outwardly upon its cam face, and thus swing the arm 37 in a clockwise direction to shift the link 36, and thereby rock the rock link 32 in a counter-clockwise direction to shift the arms 25 and 26 and thus bring the ribbon 13 forwardly and over the anvil or straight edge 17 for the making of a record. Having reached this recording position, the timing mechanism for the depressor 12 causes it to drop and impact with the pointer to make a record upon the chart. As soon as this occurs, the cam 44 reaches the point in its travel where the lug 43 is released from the tooth which has actuated it, and the weight of the parts then causes the lug to swing into seating position back of the tooth and ready to be engaged by the succeeding tooth. This swinging motion throws the ribbon frame in the reverse direction and it brings it out of register with the location of the anvil member 17, and thus leaves the chart paper unobstructed and entirely exposed to view along the line of the record. Any shock or noise which would be normally incident to this return of the ribbon frame 21 and its parts is eliminated by the spring 35, which is interposed between a lug or abutment 34 and the stud 30 and therefore effectively cushions the blow. Furthermore, by the provision of the cam 46, which functions to swing the lever 40 about the fixed fulcrum 41, the movable fulcrum 38 of the arm 37 is gradually shifted so that while the stroke of the link 36 remains constant its position of travel is varied, and consequently the ribbon is shifted transverse to its feeding direction, so that the pointer 11 cannot strike the same place on the ribbon more than once. This obviates successive impacts upon the same place in the ribbon, brings a fresh impression surface under the pointer at every stroke, increases the available impression surface, and prolongs the life of the ribbon.

Although only a single form is shown in which this invention may be embodied, it is to be understood that the invention is not limited to any specific construction, but might be applied in various forms without departing from the spirit of the invention or the scope of the appended claims.

Having thus described my invention, I claim:

1. In a recording instrument, the combination of an elongated anvil member, a movable chart arranged to feed over said anvil member, a movable pointer having a marking portion movable along the length of said member, an impression ribbon between said pointer and said chart, a depressor bar arranged to strike said pointer, and means operating after a recording operation to move said ribbon to display said record.

2. In a recording instrument comprising means for supporting and advancing a record chart, a meter pointer swinging over said chart and a transfer ribbon through which the pointer may mark its position relative to said chart on the latter, the improvement which consists in means for intermittently shifting said ribbon relative to said chart back and forth between an advanced recording position and a retracted position in which the record previously formed is visible.

3. In a recording instrument comprising means for supporting and advancing a record chart, a meter pointer swinging over said chart, a transfer ribbon between the pointer and said chart and a depressor intermittently moving said pointer toward said chart to thereby record the position of said pointer relative to the chart on the latter, the improvement which consists in means for intermittently shifting said ribbon relative to said chart back and forth between an advanced recording position and a retracted position in which the record previously formed is visible.

4. In a recording instrument, the combination with means for supporting and advancing a record chart, of a meter pointer swinging over said chart, a transfer ribbon between said pointer and said chart, and supporting means for said ribbon comprising a frame having ribbon supports at opposite sides of the chart and movable to shift said ribbon back and forth between an advanced recording position and a retracted position in which the record previously formed is exposed to view.

5. In a recording instrument, the combination with means for supporting and advancing a record chart, of a meter pointer swinging over said chart, a transfer ribbon between the pointer and the chart comprising an active portion extending transversely to the direction of movement of the chart across the latter from one side edge of the chart to the other, and means for intermittently shifting said active ribbon portion relative to said chart back and forth between an advanced recording position and a retracted position in which the record previously formed is exposed to view.

6. In a recording instrument, the combination with means for supporting and advancing a record chart, of a meter pointer swinging over said chart, a frame associated with said means, transfer ribbon rolls carried by said frame at the opposite sides of said chart, a transfer ribbon extending across the chart between said rolls, and means for intermittently shifting said frame relative to the first mentioned means to move the transfer ribbon back and forth between an advanced recording position and a retracted position in which the record previously formed is exposed to view.

7. In a recording instrument, the combination with an elongated straight edge anvil member, of means for feeding a record chart over said anvil member, a meter element pivoted at one side of said anvil member and having a pointer swinging over said member, a transfer ribbon supporting frame pivoted to turn about an axis parallel to said anvil member and having supports at opposite sides of said chart, a transfer ribbon carried by said supports and extending across the chart in a direction parallel to said anvil member, means for intermittently moving said pointer toward said anvil to thereby make a record mark on said chart, and means for shifting said frame transversely to said anvil to move said transfer ribbon back and forth between an advanced recording position and a retracted position in which the record previously formed is exposed to view.

8. In a recording instrument, the combination with means for supporting and advancing a record chart, of a meter pointer swinging over said chart, a depressor for intermittently moving said pointer towards said chart, a shiftable frame provided with supporting means at the opposite sides of said chart, a transfer ribbon mounted on said means and interposed between said pointer and chart and extending across the chart, and means for intermittently actuating said depressor and frame in timed relation to depress said pointer and to shift the transfer ribbon back and forth between an advanced recording position and a retracted position in which the record previously formed is exposed to view.

9. In a recording instrument, the combination with means for supporting and advancing a record chart, and a meter pointer swinging over said chart, of a frame associated with said means, transfer ribbon rolls carried by said frame at the opposite sides of said chart, a transfer ribbon extending across the chart between said rolls, operating means for periodically moving said frame relative to the first mentioned means to shift the transfer ribbon back and forth between an advanced recording position and a retracted position in which the record previously formed is exposed to view, and means for periodically adjusting said frame relative to said operating means to thereby vary the advanced recording position of said ribbon.

10. In a recording instrument, the combination with a meter and its pointer, of co-operating recording mechanism comprising a supporting frame work, means mounted thereon for advancing a record chart beneath the path of movement of the free end of said pointer, a transfer ribbon extending across said chart, a frame having supports for said ribbon at the opposite side of said chart, said frame being pivotally connected to said frame work to turn with respect to the latter and thereby shift the ribbon back and forth between an advanced recording position and a retracted position in which the record previously formed is exposed to view, and means for so turning said frame comprising a rotating cam mounted on said frame work.

11. In a recording instrument, the combination with a meter and its pointer, of co-operating recording mechanism comprising a supporting frame work means mounted thereon for advancing a record chart beneath the path of movement of the free end of said pointer, a transfer ribbon extending across said chart, a frame having supports for said ribbon at the opposite side of said chart, said frame being pivotally connected to said frame work to turn with respect to the latter and thereby shift the ribbon back and forth between an advanced recording position and a retracted position in which the record previously formed is exposed to view, means for so turning said frame comprising a rotating cam mounted on said frame work, and periodically operating means for adjusting said frame relative to the cam to thereby vary the advanced recording position of the ribbon.

12. In a recording instrument, the combination with a meter and its pointer, of co-operating recording mechanism comprising a supporting frame work, means mounted thereon for advancing a record chart beneath the path of movement of the free end of said pointer, a transfer ribbon extending across said chart, said frame being pivotally connected to said frame work to turn with respect to the latter and thereby shift the ribbon back and forth between an advanced recording position and a retracted position in which the record previously formed is exposed to view, and means for so turning said frame comprising a rotating cam mounted on said frame work and operating connections between said cam and frame work including a shock absorber.

13. In a recording instrument, the combination with a meter and its pointer, of co-operating recording mechanism comprising a supporting frame work, means mounted thereon for advancing a record chart beneath the path of movement of the free end of said pointer, a transfer ribbon extending across said chart, said frame being pivotally connected to said frame work to turn with respect to the latter and thereby shift the ribbon back and forth between an advanced recording position and a retracted position in which the record previously formed is exposed to view, and means for so turning said frame comprising a rotating cam mounted on said frame work and operating connections between said frame and cam including a lever and an adjustable fulcrum for the latter.

Signed at Philadelphia, in the county of Philadelphia, State of Pennsylvania, this 18th day of October, 1923.

GEORGE W. GRISDALE.